US012325155B2

(12) United States Patent
Shi et al.

(10) Patent No.: US 12,325,155 B2
(45) Date of Patent: Jun. 10, 2025

(54) METHOD FOR RECYCLING RESIDUE FROM MXene PREPARATION AND USE OF RESIDUE IN BIOSENSOR

(71) Applicant: WUHAN INSTITUTE OF TECHNOLOGY, Wuhan (CN)

(72) Inventors: Shengwei Shi, Wuhan (CN); Jinxin Xu, Wuhan (CN); Qi Zhang, Wuhan (CN); Jianbo Wan, Wuhan (CN); Tianyi Liu, Wuhan (CN)

(73) Assignee: WUHAN INSTITUTE OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/924,729

(22) Filed: Oct. 23, 2024

(65) Prior Publication Data
US 2025/0050543 A1 Feb. 13, 2025

Related U.S. Application Data

(63) Continuation of application No. PCT/CN2023/095454, filed on May 22, 2023.

(30) Foreign Application Priority Data

Sep. 30, 2022 (CN) .................. 202211209343.X

(51) Int. Cl.
B29B 7/00 (2006.01)
B29K 29/00 (2006.01)
B29K 509/04 (2006.01)

(52) U.S. Cl.
CPC .......... B29B 7/005 (2013.01); B29K 2029/04 (2013.01); B29K 2509/04 (2013.01)

(58) Field of Classification Search
CPC .. B29B 7/005; B29K 2029/04; B29K 2509/04
See application file for complete search history.

(56) References Cited

U.S. PATENT DOCUMENTS

| 2019/0352430 A1 | 11/2019 | Demirel et al. |
| 2021/0215636 A1 | 7/2021 | Claussen et al. |
| 2024/0332017 A1 | 10/2024 | Scheideler et al. |

FOREIGN PATENT DOCUMENTS

| CN | 107099054 A | 8/2017 |
| CN | 114539695 A | 5/2022 |

(Continued)

OTHER PUBLICATIONS

Internation Search Report of PCT/CN2023/095454, Mailed Sep. 27, 2023.

(Continued)

Primary Examiner — James Sanders

(57) ABSTRACT

The present disclosure discloses a method for recycling a residue from MXene preparation, including the following steps: recovering a bottom residual sediment produced in preparation of MXene through etching in a minimally intensive layer delamination (MILD) method, mixing the bottom residual sediment with a molten polyvinyl alcohol (PVA) solution, and drying to prepare a $Ti_3C_2T_x$-$Ti_3AlC_2$/PVA composite film. The present disclosure can effectively utilize a residue from an MXene process to prepare a composite film with both excellent mechanical properties and electrical conductivity. The composite film has extremely-high sensitivity for stress-strain and prominent stability, and is suitable for flexible connection and sensing of biosensors, robots, or the like. The present disclosure has significant economic and environmental benefits, and is suitable for promotion and application.

7 Claims, 8 Drawing Sheets

(56) References Cited

FOREIGN PATENT DOCUMENTS

| | | |
|---|---|---|
| CN | 116063711 A | 5/2023 |
| KR | 20220066584 A | 5/2022 |

OTHER PUBLICATIONS

Cheng Zhi, Preparation of Lightweight Ti3C2Tx Composite Films and High Performance EMI Shielding Applications, Engineering Science &Technology I, China Master's Theses Full-text Database, Jan. 15, 2022, pp. B020-B1338, China.

METHOD FOR RECYCLING RESIDUE FROM MXene PREPARATION AND USE OF RESIDUE IN BIOSENSOR

CROSS-REFERENCE TO RELATED APPLICATION

This application is a continuation of International Patent Application No. PCT/CN2023/095454 with a filing date of May 22, 2023, designating the United States, now pending, and further claims priority to Chinese Patent Application No. 202211209343.X with a filing date of Sep. 30, 2022. The content of the aforementioned applications, including any intervening amendments thereto, is incorporated herein by reference.

TECHNICAL FIELD

The present disclosure belongs to the technical field of functional materials, and specifically relates to a method for recycling a residue from MXene preparation and a use of the residue in a biosensor.

BACKGROUND

As a novel two-dimensional material with stacked sheets, MXene has structural characteristics of the traditional two-dimensional materials such as graphene, and also exhibits excellent optoelectronic properties. An interlayer spacing of MXene is adjustable in a large range, and groups on a surface of MXene can be easily functionalized. Because MXene is composed of a wide variety of elements, it is possible to conduct molecular design and regulation for physical and chemical properties of MXene. Thus, MXene has potential applications in many fields such as supercapacitors, electromagnetic shielding, sensors, and photocatalysis. In particular, the electrical performance of MXene has ultra-high sensitivity for stress-strain responses, and thus the application of MXene in sensors has attracted much attention. Currently, a gage factor (GF) of MXene used in a piezoelectric sensor is more than 180.

MXene is usually prepared by the minimally intensive layer delamination (MILD) method. However, after MXene is prepared through etching in the MILD method, a large amount of sediment is produced at the bottom. The sediment often cannot be properly recycled, but is discarded as waste, which causes the huge material waste and increases the production and post-treatment costs for MXene.

The sediment produced in the MILD method mainly includes MXene ($Ti_3C_2Tx$) of different layers, a small amount of an unetched MAX phase, and a blend of incompletely-etched MAX phases. The MXene with a two-dimensional structure has excellent electrical conductivity. In addition, an outer layer of the MXene includes abundant termination groups. These termination groups can allow a prominent interaction with a polymer material such as polyvinyl alcohol (PVA) to produce a composite material with a stable structure. The unetched and incompletely-etched MAX phases with three-dimensional structures have a high mechanical strength, interlayer lubricity, and corrosion resistance, and thus can provide excellent mechanical properties and environmental stability for a composite material. Therefore, the residue from MXene preparation is actually not waste. If a residue from MXene preparation can be utilized reasonably, a production cost of MXene can be reduced and a new product with a high added value can be additionally provided, which undoubtedly has a potential application prospect and an environmental value. However, a residue from the current MXene preparation is a very viscous brown substance, and can hardly be separated, recovered, and effectively utilized by a conventional method.

SUMMARY OF PRESENT INVENTION

In view of the problems that there is huge material waste in MXene preparation and it is difficult to recycle a residue from MXene preparation in the prior art, an objective of the present disclosure is to provide a method for recycling a residue from MXene preparation and a use of the residue in a biosensor. In the present disclosure, a residue from preparation of MXene by etching an MAX phase is compounded with PVA to produce a composite film with very-high sensitivity and excellent stability, and the composite film can be well applied to the flexible connection and sensing of a biosensor and a robot. The present disclosure can effectively utilize a residue from an MXene process to prepare a composite film with both excellent mechanical properties and electrical conductivity, and the composite film has extremely-high sensitivity for stress-strain and prominent stability. The present disclosure has significant economic benefits and prominent environmental benefits, provides a new product with a high added value while effectively reducing the discharge of solid waste, and is suitable for promotion and application.

To allow the above objective, the present disclosure adopts the following technical solutions:

The present disclosure provides a method for recycling a residue from MXene preparation, including: recovering a bottom residual sediment produced in preparation of MXene through etching in an MILD method, mixing the bottom residual sediment with a molten PVA solution to obtain a mixture, and drying the mixture to prepare a $Ti_3C_2T_x$-$Ti_3AlC_2$/PVA composite film. The bottom residual sediment is a $Ti_3C_2Tx$-$Ti_3AlC_2$-based mixture (which is mainly a mixture of $Ti_3C_2Tx$ and $Ti_3AlC_2$). The method specifically includes the following steps:

1) etching $Ti_3AlC_2$ powder by an MILD method, adding water, and conducting centrifugal separation multiple times to obtain a bottom residual sediment; and recovering and drying the bottom residual sediment to obtain the residue from MXene preparation (namely, the $Ti_3C_2Tx$-$Ti_3AlC_2$-based mixture); and 2) adding PVA particles to water, heating until the PVA particles are completely molten to obtain a PVA solution, adding the residue from MXene preparation proportionally to the PVA solution, and thoroughly stirring (heating temperature: 60° C. to 150° C., stirring rate: 100 rpm to 500 rpm, and time: 10 min to 30 min); and conducting filtration and drying to obtain the $Ti_3C_2T_x$-$Ti_3AlC_2$/PVA composite film.

In the above solution, the etching includes the following steps:

1.1) adding a $Ti_3AlC_2$ powder as an MAX phase to an aqueous solution of an etchant, and stirring to allow chemical etching for the MAX phase; adding water, conducting centrifugation, and adjusting a pH to 6 to 7; and washing to remove the residual etchant to obtain a preliminarily-etched MXene product;

1.2) adding an intercalator to a solution of the preliminarily-etched MXene product, and conducting stirring, an ultrasonic treatment, and centrifugation to obtain a bottom sediment; and 1.3) recovering the bottom sediment, and vacuum-drying the bottom sediment to obtain the residue from MXene preparation (namely, the $Ti_3C_2Tx$-$Ti_3AlC_2$-based mixture).

In the above solution, the residue from MXene preparation has a particle size of 100 μm to 400 μm.

In the above solution, the etchant is selected from the group consisting of HF, HCl/LiF, $NaHF_2$, $KHF_2$, and $NH_4HF_2$, and a mass ratio of the etchant to the $Ti_3AlC_2$ powder as the MAX phase is 1:(0.5-3).

In the above solution, the stirring in the step 1.1) is conducted at a rotational speed of 400 rpm to 1,000 rpm for 48 h to 72 h.

In the above solution, the intercalator is one or more selected from the group consisting of ethanol, dimethylsulfoxide (DMSO), tetramethylammonium hydroxide (TMAOH), and tetrabutylammonium hydroxide (TBAOH), and a mass ratio of the intercalator to the MAX phase powder is 1:(5-20).

In the above solution, in the step 1.2), the stirring is conducted at a rotational speed of 100 rpm to 1,000 rpm for 1 h to 8 h; the ultrasonic treatment is conducted at a power of 100 W to 500 W for 0.5 h to 5 h; and the centrifugation is conducted at a rotational speed of 2,000 rpm to 12,000 rpm 1 times to 6 times for 10 min to 60 min each time. In the step 1.3), the vacuum-drying is conducted for 12 h to 48 h at a vacuum degree of 0.05 MPa to 0.1 MPa and a temperature of 40° C. to 60° C.

In the above solution, a solid-to-liquid ratio of PVA to water in the molten PVA solution is 1 g:(0.02-1) mL.

In the above solution, an amount of the $Ti_3C_2Tx$-$Ti_3AlC_2$-based mixture is 10% to 25% of a mass of PVA particles; and the heating temperature is 60° C. to 150° C., the stirring rate is 100 rpm to 500 rpm, and the time is 10 min to 30 min.

Preferably, the amount of the $Ti_3C_2Tx$-$Ti_3AlC_2$-based mixture is 8% to 18% of the mass of the PVA particles.

More preferably, the amount of the $Ti_3C_2Tx$-$Ti_3AlC_2$-based mixture is 10% to 15% of the mass of the PVA particles.

A $Ti_3C_2T_x$-$Ti_3AlC_2$/PVA composite film prepared according to the above solution is provided. When used in preparation of a biosensor, the composite film exhibits excellent sensitivity (response time: less than 100 ms) and flexibility. In addition, after being bent, the composite film can return to an original state in a short time, indicating excellent stability.

Principles of the present disclosure are as follows:

In the present disclosure, a large amount of a residue (a $Ti_3C_2Tx$-$Ti_3AlC_2$-based mixture) produced in an MXene etching process is further compounded with PVA to produce a composite film. MXene with a two-dimensional structure in the residue has excellent electrical conductivity. In addition, an outer layer of the MXene includes abundant termination groups. These termination groups can allow a prominent interaction with a polymer material such as PVA to produce a composite material with a stable structure. The unetched and incompletely-etched MAX phases with three-dimensional structures introduced in the residue have a high mechanical strength, interlayer lubricity, and corrosion resistance, and thus can provide excellent mechanical properties and environmental stability for a composite material. The composite film has prominent mechanical properties and electrical conductivity.

Compared with the prior art, the present disclosure has the following beneficial effects:

1) The present disclosure proposes for the first time that a large amount of a residue produced in an MXene etching process is recovered and further compounded with PVA to prepare a composite film. The present disclosure can allow the recycling of a very viscous $Ti_3C_2T_x$-$Ti_3AlC_2$-based mixture that is difficult to separate to prepare a composite film with both excellent mechanical properties and electrical conductivity. The present disclosure has significant economic and environmental benefits.

2) Through the tracking of a change of resistance after bending, the $Ti_3C_2T_x$-$Ti_3AlC_2$/PVA composite film can serve as a flexible biosensor to allow the monitoring of motions of joints such as fingers and wrists of the human body, with extremely-high sensitivity and prominent flexibility. In addition, after being bent, the sensor can return to an original state in a short time, indicating prominent stability. The composite film has potential applications in wearable electronics.

3) Because the $Ti_3C_2T_x$-$Ti_3AlC_2$ itself has a prominent mechanical strength, the $Ti_3C_2T_x$-$Ti_3AlC_2$/PVA composite film has a high tensile strength and can be used for sensing of organisms. In addition, due to a high tensile strength and elongation at break, the $Ti_3C_2T_x$-$Ti_3AlC_2$/PVA composite film is expected to have potential applications in the flexible connection and sensing of robots.

DETAILED DESCRIPTION OF THE EMBODIMENTS

Figure 1:
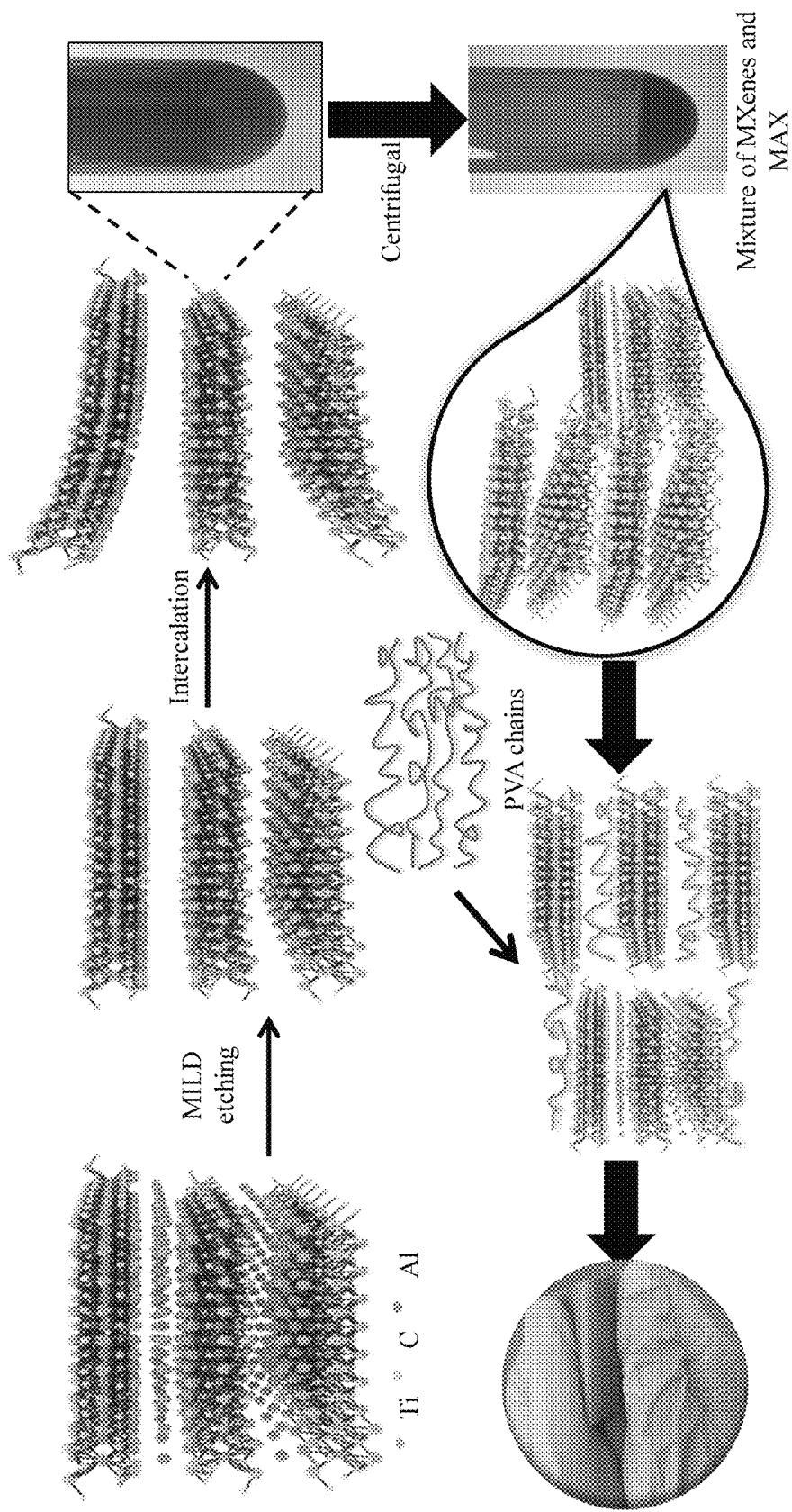
FIG. 1 is a schematic diagram showing a method for recycling a residue from MXene preparation and a preparation process of a $Ti_3C_2Tx$-$Ti_3AlC_2$/PVA composite film in Example 1.

In order to well understand the present disclosure, the content of the present disclosure is further illustrated below with reference to specific examples. However, the content of the present disclosure is not limited to the following examples.

The MAX, or $M_{n+1}AX_n$, phases are layered, hexagonal, early transition-metal carbides and nitrides, where n=1, 2, or 3, "M" is an early transition metal, "A" is an A-group (mostly group 13 or 14) element, and "X" is C and/or N.

In the following examples, the $Ti_3C_2T_x$-$Ti_3AlC_2$-based mixture is a bottom residual sediment collected during preparation of MXene $Ti_3C_2T_x$ filter membrane through etching in an MILD method. A specific preparation method of the $Ti_3C_2T_x$ filter membrane includes:

1) 2 g of LiF and 40 mL of 9 M hydrochloric acid are mixed and stirred in a polytetrafluoroethylene (PTFE) beaker for 30 min. Then the beaker is placed in ice water, 2 g of $Ti_3AlC_2$ is slowly added to the beaker, then a reaction temperature is adjusted to 40° C., and continuous stirring is conducted for 45 h to allow a reaction. A mixed solution produced after the reaction is completed is centrifuged, adjusted to a pH of 6 to 7, and subjected to an ultrasonic treatment, vacuum suction filtration, and drying to obtain a black preliminary MXene ($Ti_3C_2T_x$) product.

2) DMSO is added to a beaker with the preliminary MXene product, stirring is conducted for 4 h, and then an ultrasonic treatment is conducted (150 W, 2 h). Then, deionized water is added to the beaker and centrifugation is conducted (rotational speed: 8,000 rpm, time: 5 min) to remove the residual intercalator, and a main product is collected. Deionized water is further added to the main product, and centrifugation is conducted (rotational speed: 3,500 rpm, time: 30 min) to obtain a bottom residual sediment. The bottom residual sediment is dried under vacuum to obtain $Ti_3C_2Tx$-$Ti_3AlC_2$. A main component of $Ti_3C_2Tx$-$Ti_3AlC_2$ is a mixture of incompletely-etched $Ti_3C_2Tx$ and $Ti_3AlC_2$.

Example 1

A method for recycling a residue from MXene preparation was provided. A flow chart of the method was shown in FIG. 1. The method specifically included the following steps:

1) A $Ti_3C_2Tx$-$Ti_3AlC_2$-based mixture was ground into fine particles (100 μm to 400 μm) for later use. 1 g of PVA was taken and added to 50 mL of deionized water, and heated at 100° C. until the PVA was completely molten to obtain a molten PVA solution.

2) 20 mL of deionized water was added to the fine particles of the $Ti_3C_2Tx$-$Ti_3AlC_2$-based mixture, and ultrasonic dispersion was fully conducted to obtain a particle dispersion. The particle dispersion was slowly poured into the molten PVA solution under stirring, and further stirring was fully conducted (temperature: 100° C., stirring rate: 120 rpm, and time: 15 min) to obtain a mixed solution. Different contents of PVA were set (corresponding amounts of $Ti_3C_2Tx$-$Ti_3AlC_2$ were 10%, 20%, 25%, and 30% of a mass of PVA, respectively). Before PVA began to be cured, resulting mixed solutions each were filtered through a gauze, then poured into a standard PTFE mold of 7.5×10×1 cm³, and dried naturally for 48 h to obtain PVA/$Ti_3C_2Tx$-$Ti_3AlC_2$ composite films with excellent toughness.

FIG. 1 shows the method for recycling a residue from MXene preparation and the preparation process of a $Ti_3C_2Tx$-$Ti_3AlC_2$/PVA composite film in Example 1. After etching and intercalation with DMSO, layered MXene is obtained through repeated centrifugation processes (supernatants are collected). The layered MXene can be used for other experiments. A clay-like mixture settled at a bottom of a centrifuge tube is extracted by operations such as suction filtration and drying to obtain the residue from MXene preparation ($Ti_3C_2Tx$-$Ti_3AlC_2$) in the present disclosure. Then $Ti_3C_2Tx$-$Ti_3AlC_2$ was ground into a powder, and the powder and PVA were mixed in different ratios and then naturally dried to obtain the composite films. The above process can ensure that the composite films have excellent flexibility and mechanical strength.

Figure 2:
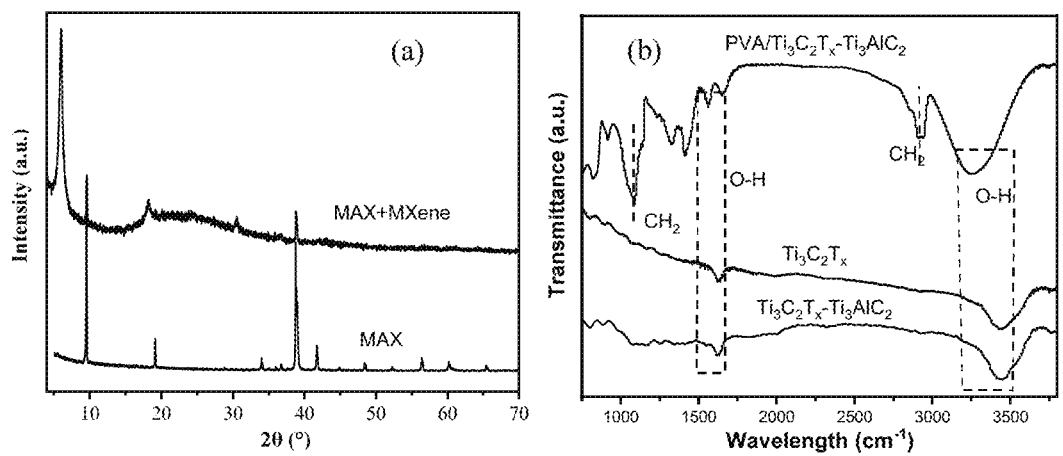
FIG. 2 shows an X-ray diffraction (XRD) pattern (a) and a Fourier transform infrared spectroscopy (FTIR) spectrum (b) of $Ti_3C_2Tx$-$Ti_3AlC_2$ adopted in Example 1.

FIG. 2a shows an XRD pattern of 25% $Ti_3C_2Tx$-$Ti_3AlC_2$ obtained in this example. It can be seen that, in the bottom sediment, in addition to the same characteristic peak (002) at 9.5° as the MAX phase and a characteristic peak (104) at 39.5° for Al, there is a strong characteristic peak at 6.2° lower than 9.5°, which is the same angle as the characteristic peak (002) of DMSO-MXene. It can also be seen that the bottom sediment is mainly a mixture of MAX and MXene.

FIG. 2b shows an FTIR spectrum of a $Ti_3C_2Tx$-$Ti_3AlC_2$/PVA (20%) composite film obtained in this example. It can be seen from this figure that MXene-MAX has a stretching vibration peak of O—H at 3,430 cm$^{-1}$, while the $Ti_3C_2Tx$-$Ti_3AlC_2$/PVA film sample has a significant red shift (3,250 cm$^{-1}$). The above results indicate that, after being added, $Ti_3C_2Tx$-$Ti_3AlC_2$ can produce hydrogen bonding with a PVA molecular chain. The same red shift is also observed at a vibration peak of O—H at 1,550 cm$^{-1}$.

Figure 3:
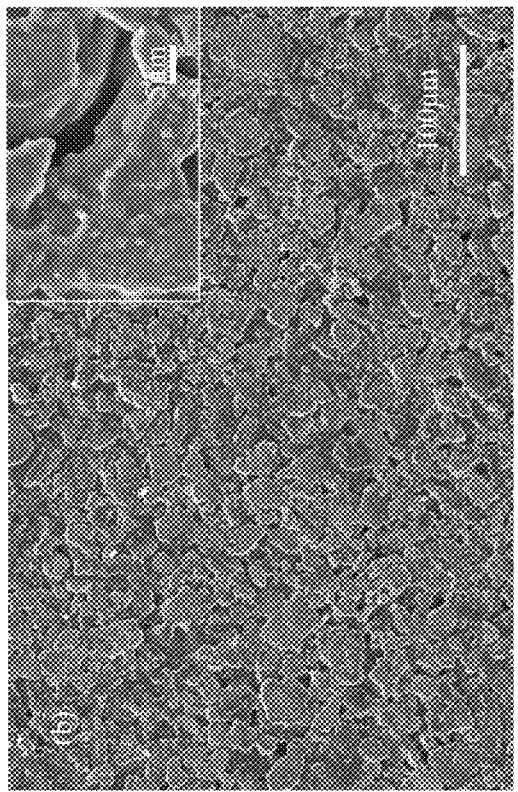
FIG. 3 shows scanning electron microscopy (SEM) images of composite films with different $Ti_3C_2Tx$-$Ti_3AlC_2$ contents in Example 1, where (a) is for a composite film with a $Ti_3C_2Tx$-$Ti_3AlC_2$ content of 10%, (b) is for a composite film with a $Ti_3C_2Tx$-$Ti_3AlC_2$ content of 20%, (c) is for a composite film with a $Ti_3C_2Tx$-$Ti_3AlC_2$ content of 25%, and (d) is for a composite film with a $Ti_3C_2Tx$-$Ti_3AlC_2$ content of 30%.
Figure 3:
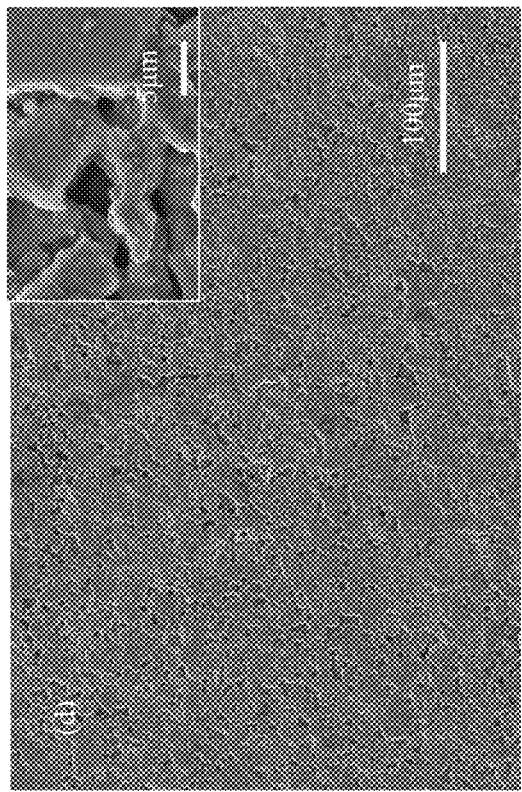
Figure 3:
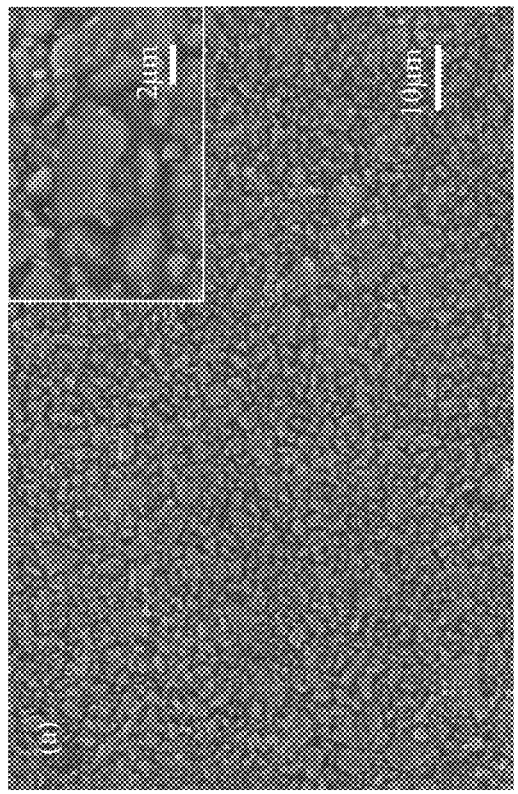
Figure 3:
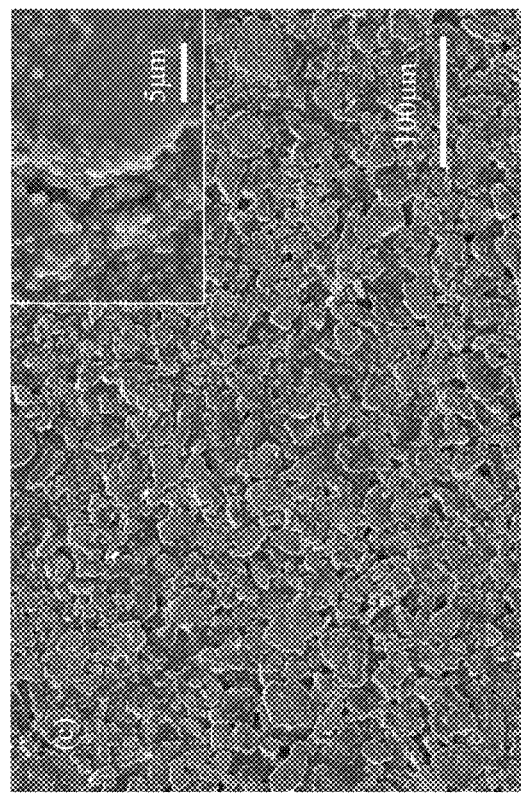

FIG. 3 shows SEM images of the composite films with different $Ti_3C_2Tx$-$Ti_3AlC_2$ contents in Example 1. As shown in this figure, in a sample including 10% of a $Ti_3C_2Tx$-$Ti_3AlC_2$ mixture, lumpy particles are scattered in PVA (FIG. 3a), and the clear stacking of layered structures can be observed at a high magnification, but a continuous conductive network is not formed. When a content of the mixture increases to 20% (FIG. 3b), sheets overlap and are stacked, with a specified gap. When the content of the mixture further increases to 25% (FIG. 3c), it can be seen that a surface is relatively smooth and $Ti_3C_2Tx$-$Ti_3AlC_2$ is uniformly distributed. Under a 5,000× magnification, it can be observed that MXene sheets with two-dimensional layered structures are stacked in a composite film, which also proves that the improvement in electrical conductivity is mainly attributed to a role of $Ti_3C_2Tx$ ($Ti_3AlC_2$ is non-conductive).

Example 2

A method for recycling a residue from MXene preparation and a use of the residue in a biosensor were provided, including the following steps:

1) 1 g of PVA was taken and added to 50 mL of deionized water, and heated at 100° C. until the PVA was completely molten to obtain a molten PVA solution.

2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass of $Ti_3C_2Tx$-$Ti_3AlC_2$ was 25% of a mass of PVA. Before PVA began to be cured, the mixed solution was filtered through a gauze, then poured into a standard PTFE mold of 7.5×10×1 cm³, and dried naturally for 48 h to obtain a PVA/$Ti_3C_2Tx$-$Ti_3AlC_2$ composite film.

Figure 4:
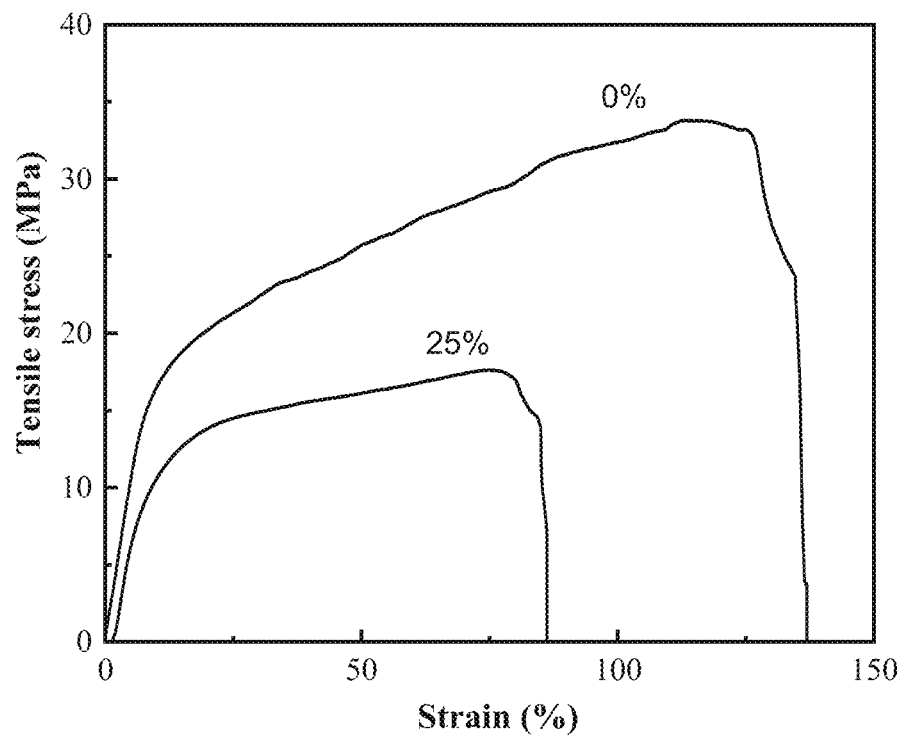
FIG. 4 shows tensile stress-strain curves of a 25% $Ti_3C_2T_x$-$Ti_3AlC_2$/PVA composite film obtained in Example 2 and a pure PVA film.

FIG. 4 shows tensile stress-strain curves of the 25% $Ti_3C_2T_x$-$Ti_3AlC_2$/PVA composite film in Example 2 and a pure PVA film. The addition of a small amount of $Ti_3C_2Tx$-$Ti_3AlC_2$ allows hydrogen bonding with PVA, which is conducive to improving a tensile strength of a material. However, the further increase of an amount of $Ti_3C_2Tx$-$Ti_3AlC_2$ leads to a limited improvement effect for a tensile strength of a material. A large amount of $Ti_3C_2Tx$-$Ti_3AlC_2$ will destroy the hydrogen bonding between PVA, such that a strength of a material is weakened. As shown in FIG. 4, the addition of 25% of $Ti_3C_2T_x$-$Ti_3AlC_2$ significantly reduces a tensile strength of PVA. When a content of $Ti_3C_2Tx$-$Ti_3AlC_2$ is 25%, an elongation at break is 78.9%, a tensile strength is 17.6 MPa, a Young's modulus is 1.1 GPa, and a resistance is $1.25 \times 10^6 \Omega$.

Figure 5:
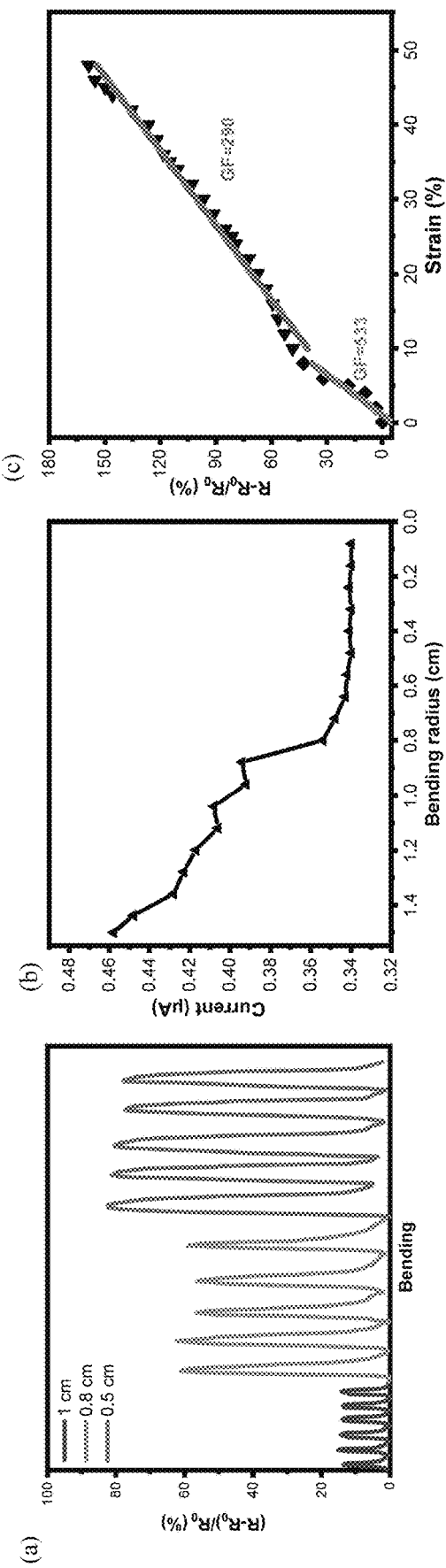
FIG. 5 shows resistance changes of the 25% $Ti_3C_2Tx$-$Ti_3AlC_2$/PVA composite film obtained in Example 2, where (a) shows resistance changes under different bending radii, (b) shows output current changes of the composite film at a given voltage of 1 V under different bending radii, and (c) shows a change of resistance of the composite film with a tensile strain.

FIG. 5 shows resistance changes of the 25% $Ti_3C_2Tx$-$Ti_3AlC_2$/PVA composite film in Example 2. FIG. 5a shows resistance changes under different bending radii. The resistance of the composite film changes significantly with the gradual decrease of a bending radius. When the bending radius is merely 1 cm, the resistance increases by 17%. When the bending radius reaches 0.8 cm, the resistance increases by about 60%. When the bending radius reaches 0.5 cm, the resistance changes by 80%. Moreover, the resistance of the composite film can return to an initial value after a bending process, indicating that the composite film has excellent flexibility and stability. FIG. 5b shows output current changes of the composite film at a given voltage of 1 V under different bending radii. When a bending radius is greater than 1, an output current does not change significantly. As a bending degree increases, a resistance increases and an output current decreases correspondingly. When a bend radius is smaller than 0.4 cm, a current change is relatively stable, which is attributed to the efficient connection established inside the material. Even when folded in half, the composite film is still conductive. FIG. 5c shows a change of resistance of the composite film with a tensile strain. When the tensile strain is less than 10%, GF is 533, indicating very high sensitivity. When the tensile strain exceeds 10%, GF still reaches 290. When the tensile strain exceeds 52%, the composite film is basically not conductive due to the fracture of connection inside the composite film. According to GF measurement results of the material, the $Ti_3C_2Tx$-$Ti_3AlC_2$/PVA exhibits high sensitivity in detection of motion changes in a small range, and thus can be used in various types of sensors.

Figure 6:
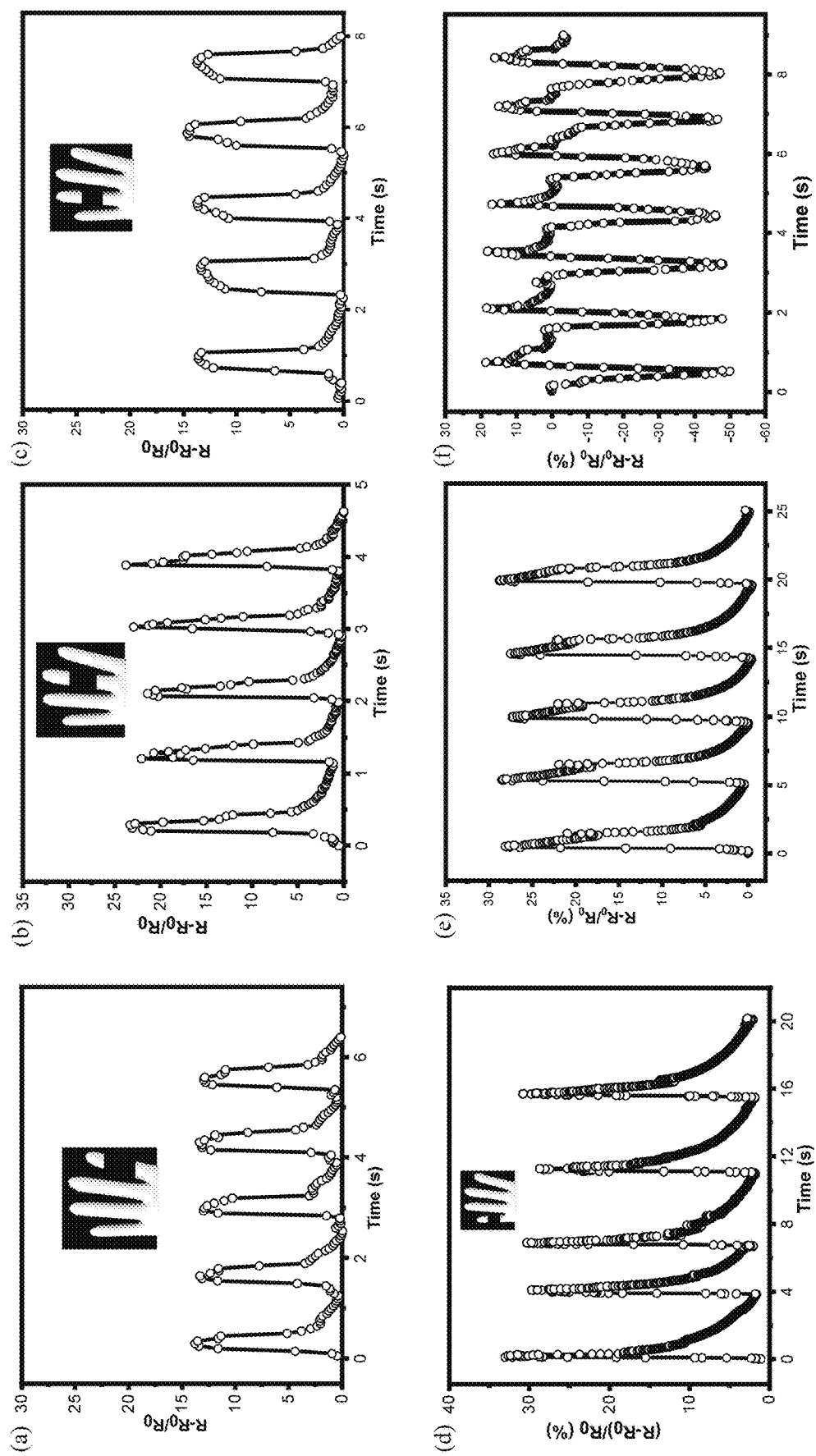
FIG. 6 shows use effects of the composite film obtained in Example 2 in preparation of a biosensor, where (a) is for an index finger, (b) is for a middle finger, (c) is for a ring finger, (d) is for a little finger, (e) is for wrist joint bending, and (f) is for wrist joint twisting.

FIG. 6 shows bending resistance changes of the composite film in Example 2 applied to different motion parts, where (a) is for an index finger, (b) is for a middle finger, (c) is for a ring finger, (d) is for a little finger, (e) is for wrist joint bending, and (f) is for wrist joint twisting. As shown in FIG. 6a to FIG. 6d, after a finger is bent, the resistance increases significantly with an extremely-short response time (less than 100 ms), indicating very high sensitivity (there are slight differences among resistance changes tested due to different flexibilities of knuckles of a tester). After the composite film is bent, it takes a specified time for resistance of the composite film to return to an initial value, which is attributed to a specified fracture of connection inside the composite film after being bent. Therefore, it takes a specified time to rebuild an internal connection during a recovery process. As shown in FIG. 6e to FIG. 6f, the composite film also has an excellent response rate and sensitivity for a wrist joint, and the resistance of the composite film increases significantly after the wrist joint is bent. However, it takes a longer time to recover for the wrist joint than the knuckles. The motion in a wide range has a great impact on the inside of the material, and thus it takes a long time to recover. Resistance changes for wrist twisting and bending are significantly different. After twisting, the resistance does not increase, but decreases significantly. This may be because the twisting will cause unconnected $Ti_3C_2Tx$ MXene sheets inside the composite film to be cross-stacked, such that the resistance of the composite film can be significantly reduced. A response time for wrist twisting is also short. The resistance is significantly reduced by 50% after twisting. After the twisting is recovered, the resistance will slightly increase and then decrease. This is because the internal MXene undergoes a misalignment and reconnection process during a film recovery process. However, a twisting resistance recovery process takes a shorter time than a bending resistance recovery process. The above results show that the $Ti_3C_2Tx$-$Ti_3AlC_2$/PVA composite film can be fully used in biosensors.

Example 3

A method for recycling a residue from MXene preparation was provided, including the following steps:
1) 1 g of PVA was taken and added to 50 mL of deionized water, and heated at 100° C. until the PVA was completely molten to obtain a molten PVA solution.
2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass of $Ti_3C_2Tx$-$Ti_3AlC_2$ was 10% of a mass of PVA. Before PVA began to be cured, the mixed solution was filtered through a gauze, then poured into a standard PTFE mold of $7.5 \times 10 \times 1$ cm$^3$, and dried naturally for 48 h to obtain a PVA/$Ti_3C_2Tx$-$Ti_3AlC_2$ composite film.

Figure 7:
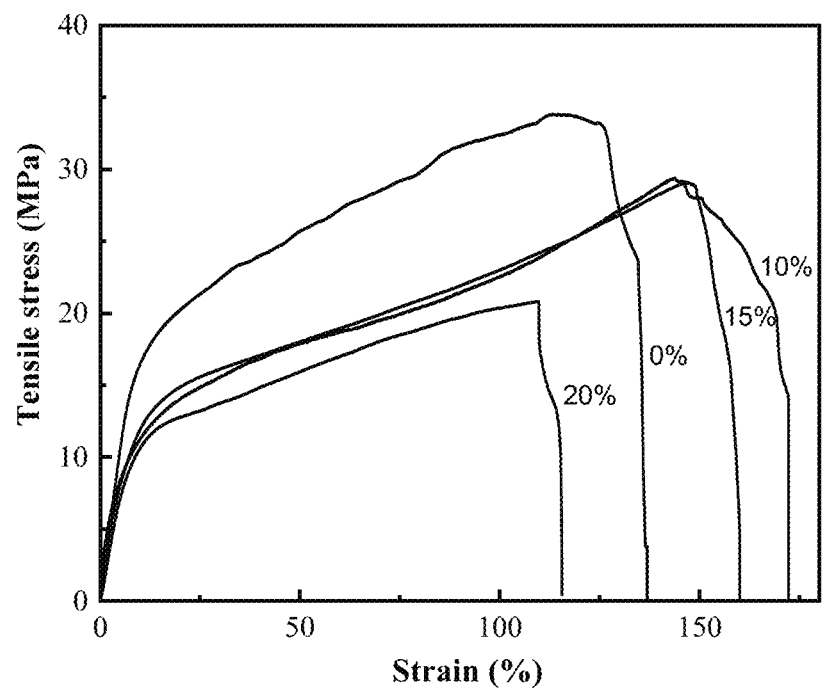
FIG. 7 shows tensile stress-strain curves of $Ti_3C_2T_x$-$Ti_3AlC_2$/PVA composite films with different contents in Examples 3 to 5 and a pure PVA film.

FIG. 7 shows tensile stress-strain curves of the 10% $Ti_3C_2T_x$-$Ti_3AlC_2$/PVA composite film in Example 3 and a pure PVA film. The composite film has an elongation at break of 147.0%, a tensile strength of 29.0 MPa, a Young's modulus of 2.1 GPa, and resistance of $8.5 \times 10^6 \Omega$.

According to test results, the composite film has high sensitivity (response time: less than 100 ms) in detection of motion changes in a small range and excellent mechanical properties, and thus can be used in various types of sensors.

Example 4

A method for recycling a residue from MXene preparation was provided, including the following steps:
1) 1 g of PVA was taken and added to 50 mL of deionized water, and heated at 100° C. until the PVA was completely molten to obtain a molten PVA solution.
2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass of $Ti_3C_2Tx$-$Ti_3AlC_2$ was 15% of a mass of PVA. Before PVA began to be cured, the mixed solution was filtered through a gauze, then poured into a standard PTFE mold of $7.5 \times 10 \times 1$ cm$^3$, and dried naturally for 48 h to obtain a PVA/$Ti_3C_2Tx$-$Ti_3AlC_2$ composite film.

FIG. 7 shows tensile stress-strain curves of the 15% $Ti_3C_2T_x$-$Ti_3AlC_2$/PVA composite film in Example 4 and a pure PVA film. The composite film has an elongation at break of 145.2%, a tensile strength of 29.2 MPa, a Young's modulus of 3.5 GPa, and resistance of $6.5 \times 10^6 \Omega$.

According to test results, the composite film has high sensitivity (response time: less than 100 ms) in detection of motion changes in a small range and excellent mechanical properties, and thus can be used in various types of sensors.

Example 5

A method for recycling a residue from MXene preparation was provided, including the following steps:
1) 1 g of PVA was taken and added to 50 mL of deionized water, and heated at 100° C. until the PVA was completely molten to obtain a molten PVA solution.
2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass of $Ti_3C_2Tx$-$Ti_3AlC_2$ was 20% of a mass of PVA. Before PVA began to be cured, the mixed solution was filtered through a gauze, then poured into a standard PTFE mold of $7.5 \times 10 \times 1$ cm$^3$, and dried naturally for 48 h to obtain a PVA/$Ti_3C_2Tx$-$Ti_3AlC_2$ composite film.

FIG. 7 shows tensile stress-strain curves of the 20% $Ti_3C_2T_x$-$Ti_3AlC_2$/PVA composite film in Example 5 and a pure PVA film. The composite film has an elongation at break of 109.7%, a tensile strength of 19.9 MPa, a Young's modulus of 1.1 GPa, and resistance of $3.4 \times 10^6 \Omega$.

Control Group 1

A method for recycling a residue from MXene preparation was provided, including the following steps:
1) 1 g of PVA was taken and added to 50 mL of deionized water, and heated at 100° C. until the PVA was completely molten to obtain a molten PVA solution.
2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass of $Ti_3C_2Tx$-$Ti_3AlC_2$ was 5% of a mass of PVA. Before PVA began to be cured, the mixed solution was filtered through a gauze, then poured into a standard PTFE mold of $7.5 \times 10 \times 1$ cm$^3$, and dried naturally for 48 h to obtain a PVA/$Ti_3C_2Tx$-$Ti_3AlC_2$ composite film.

Figure 8:
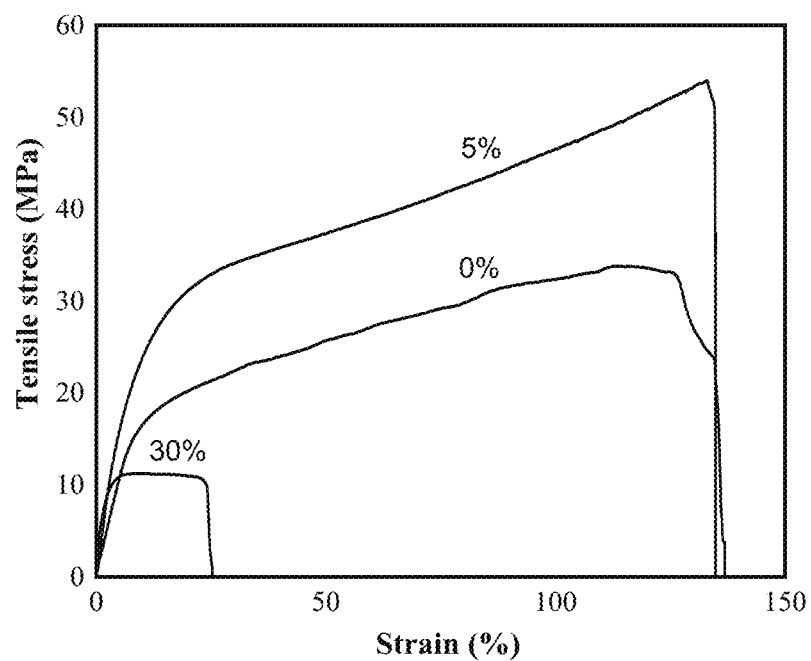
FIG. 8 shows tensile stress-strain curves of 5% and 30% $Ti_3C_2T_x$-$Ti_3AlC_2$/PVA composite films obtained in Comparative Examples 1 and 2 and a pure PVA film.

FIG. 8 shows tensile stress-strain curves of the 5% $Ti_3C_2T_x$-$Ti_3AlC_2$/PVA composite film in Comparative Example 1 and a pure PVA film. The composite film has an elongation at break of 134.8%, a tensile strength of 53.9 MPa, and a Young's modulus of 2.1 GPa. However, the composite film is basically non-conductive and is not suitable for stress-strain sensors.

Control Group 2

A method for recycling a residue from MXene preparation was provided, including the following steps:
1) 1 g of PVA was taken and added to 50 mL of deionized water, and heated at 100° C. until the PVA was completely molten to obtain a molten PVA solution.
2) 20 mL of deionized water was added to a $Ti_3C_2Tx$-$Ti_3AlC_2$-based mixture, and ultrasonic dispersion was fully conducted to obtain a mixture dispersion. The mixture dispersion was slowly poured into the molten PVA solution under stirring, and further stirring was fully conducted (temperature: 120° C., stirring rate: 80 rpm, and time: 20 min) to obtain a mixed solution. A mass content of $Ti_3C_2Tx$-$Ti_3AlC_2$ was 30%. The mixed solution was filtered through a gauze, then poured into a standard PTFE mold of $7.5 \times 10 \times 1$ cm$^3$, and dried naturally for 48 h to obtain a PVA/$Ti_3C_2Tx$-$Ti_3AlC_2$ composite film.

FIG. 8 shows tensile stress-strain curves of the 30% $Ti_3C_2T_x$-$Ti_3AlC_2$/PVA composite film in Comparative Example 2 and a pure PVA film. The composite film exhibits excellent electrical conductivity, and has resistance of $1 \times 10^6 \Omega$. However, the addition of too much $Ti_3C_2T_x$-$Ti_3AlC_2$ significantly reduces the elongation and tensile strength of PVA. The composite film has an elongation at break merely of 24%, a tensile strength of 10.9 MPa, and a Young's modulus of 2.0 GPa. The composite film is not suitable for stress-strain sensors.

The above examples are merely intended to illustrate the technical conception and characteristics of the present disclosure, such that a person familiar with the technology can understand the content of the present disclosure and implement the content accordingly, and the above examples shall not limit the protection scope of the present disclosure. Any equivalent change or modification made in accordance with the spiritual essence of the present disclosure shall fall within the protection scope of the present disclosure.

What is claimed is:
1. A method for recycling a residue from MXene preparation, comprising the following steps:
   recovering a bottom residual sediment produced in preparation of MXene through etching in a minimally intensive layer delamination (MILD) method,
   mixing the bottom residual sediment with a molten polyvinyl alcohol (PVA) solution to obtain a mixture, and
   drying the mixture to prepare a $Ti_3C_2Tx$-$Ti_3AlC_2$/PVA composite film, wherein the bottom residual sediment is a $Ti_3C_2Tx$-$Ti_3AlC_2$-based mixture.

2. The method according to claim 1, wherein the etching comprises the following steps:
   1) Adding MAX phase powder to an aqueous solution of an etchant, and stirring and heating to allow a reaction; adding water, conducting centrifugation, and adjusting a pH to 6 to 7; and conducting an ultrasonic treatment, suction filtration, and drying to obtain a preliminarily-etched MXene product;
   2) Adding an intercalator to a solution of the preliminarily-etched MXene product, and conducting stirring, an ultrasonic treatment, and centrifugation to obtain a bottom sediment; and
   3) Recovering the bottom sediment, and vacuum-drying the bottom sediment to a constant weight to obtain the residue from MXene preparation.

3. The method according to claim 2, wherein the etchant is selected from a group consisting of HF, HCl/LiF, $NaHF_2$, $KHF_2$, and $NH_4HF_2$; and a mass ratio of the etchant to the MAX phase powder is 1:(0.5-3).

4. The method according to claim 2, wherein in the step 1), the reaction under the heating and stirring is conducted at 40° C. to 80° C. for 12 h to 96 h.

5. The method according to claim 2, wherein the intercalator is one or more selected from a group consisting of ethanol, dimethylsulfoxide (DMSO), tetramethylammonium hydroxide (TMAOH), and tetrabutylammonium hydroxide (TBAOH), and a mass ratio of the intercalator to the MAX phase powder is 1:(5-20).

6. The method according to claim 2, wherein a solid-to-liquid ratio of PVA to water in the molten PVA solution is 1 g:(0.02-1) mL; and a temperature of heat-melting for the PVA is 60° C. to 150° C.

7. The method according to claim 2, wherein an amount of the $Ti_3C_2Tx$-$Ti_3AlC_2$-based mixture is 10% to 25% of a mass of PVA particles.

\* \* \* \* \*